(12) United States Patent
Sanders et al.

(10) Patent No.: US 6,899,339 B2
(45) Date of Patent: May 31, 2005

(54) ABRADABLE SEAL HAVING IMPROVED DURABILITY

(75) Inventors: Stuart A. Sanders, Palm Beach Gardens, FL (US); Kirk D. Stackhouse, Portland, CT (US); Lisa V. O'Connor, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 199 days.

(21) Appl. No.: 09/943,321

(22) Filed: Aug. 30, 2001

(65) Prior Publication Data

US 2003/0042685 A1 Mar. 6, 2003

(51) Int. Cl.[7] ................................................. F16J 15/40
(52) U.S. Cl. ...................... 277/415; 277/355; 415/173.3
(58) Field of Search ................................ 277/355, 409, 277/411, 412, 414, 415; 415/173.3, 173.4, 173.6

(56) References Cited

U.S. PATENT DOCUMENTS

| | | | |
|---|---|---|---|
| 3,680,977 A | * | 8/1972 | Rabouyt et al. ......... 415/173.6 |
| 3,834,001 A | | 9/1974 | Carroll et al. |
| 4,336,276 A | | 6/1982 | Bill et al. |
| 4,664,973 A | | 5/1987 | Otfinoski et al. |
| 5,388,959 A | * | 2/1995 | Forrester et al. ......... 415/173.4 |
| 6,202,302 B1 | * | 3/2001 | Descoteaux ................ 29/899.2 |
| 6,203,273 B1 | * | 3/2001 | Weiner et al. ........... 415/173.4 |
| 6,334,617 B1 | * | 1/2002 | Putnam et al. .............. 277/415 |
| 6,358,002 B1 | * | 3/2002 | Good et al. .............. 415/174.4 |
| 6,471,472 B1 | * | 10/2002 | Stauder et al. ........... 415/173.4 |
| 6,475,253 B2 | * | 11/2002 | Culler et al. .................. 51/295 |
| 6,508,624 B2 | * | 1/2003 | Nadeau et al. ........... 415/173.3 |
| 2002/0158417 A1 | * | 10/2002 | Wallace et al. ............. 277/414 |

FOREIGN PATENT DOCUMENTS

EP 0 939 143 9/1999

* cited by examiner

Primary Examiner—Robert J. Sandy
Assistant Examiner—Andre' L. Jackson
(74) Attorney, Agent, or Firm—Bachman & LaPointe, P.C.

(57) ABSTRACT

An air seal for use in a gas turbine engine provides improved durability, particularly at higher temperatures. The seal includes a seal substrate and an abradable seal layer on the substrate. The abradable seal layer is composed of a densified polyimide foam, preferably a thermomechanically densified foam. The seal is bonded to a stationary engine component such as a stator box or a case.

25 Claims, 2 Drawing Sheets

ABRADABLE SEAL HAVING IMPROVED DURABILITY

BACKGROUND OF THE INVENTION

The present invention relates generally to air seals for gas turbine engines, and relates more particularly to seals having improved durability.

Gas turbine engines are well known sources of power, e.g., motive power for aircraft or as power generators, and generally include compressor (typically preceded by one or more fan stages), combustor and turbine sections. As illustrated generally in FIG. 1, compressor and turbine sections (and any fan stages) each include shaft-mounted, rotating disks 1, each carrying a set of blades 2 located within a hollow housing or case 3, with intervening sets of stationary vanes 5 mounted to the case. Air seals 4,7 are provided between the tips of the blades and the case (outer air seals), and between the vanes and the disks (knife edge seals) to prevent air leakage between those components.

Air is ingested through an engine inlet and compressed by rotating disks and associated blades in the compressor. The compressed air is then burned with fuel in the combustor to generate high pressure and temperature gases, which cause rotation of the turbine sections and associated fan compressor stages and are then ejected out an engine exhaust to provide thrust. The case is intended to prevent leakage of air or combustion products around the tips of the blades, i.e., between the blade tips and the case, which leakage reduces the efficiency of the engine.

Despite the design of components to minimize leakage, a substantial proportion of any leakage which does occur in a normally-operating gas turbine engine occurs between the tips of the blades and the case, and between the tips of the vanes and the disks. One manner of eliminating such leakage is to fabricate all mating parts to extremely close tolerances, which becomes increasingly expensive as tolerances are reduced. Moreover, given the temperature ranges to which the parts are subjected to before, during and after operation, and the resultant thermal expansion and contraction of the parts, such close tolerances will at times result in interference between mating parts and corresponding component wear and other damage. Accordingly, gas turbine engine designers have devoted significant effort to developing effective air seals, and particularly seals composed of abradable materials. See, e.g., U.S. Pat. No. 4,936,745 to Vine et al. and U.S. Pat. No. 5,706,231 to Nissley et al., which are assigned to the assignee of the present invention and expressly incorporated by reference herein.

Seals require a balance of several properties including relative abradability upon being contacted by a rotating blade tip, erosion resistance, durability, thermal expansion balanced with that of the underlying material, and relative ease and reasonable cost of manufacture. See, e.g., U.S. Pat. No. 5,536,022 to Sileo, which is also assigned to the assignee of the present invention and expressly incorporated by referenced herein.

A typical compressor air seal includes the seal substrate, e.g., a metal substrate, an optional metal layer composed of a metal powder plasma sprayed on the substrate, and an abradable, sealing layer applied to the metal layer. Typical sealing layers include metal matrix of aluminum and silicon with some amount of embedded polyester powder particles and is plasma sprayed onto the substrate. Other seal materials include silicone rubber and other elastomeric seal materials, which may also include hollow microspheres for porosity, and these materials are typically applied in a highly viscous state and allowed to dry/cure in situ. While these seal systems have provided adequate performance to date, there remains a desire for a seal system having a higher temperature capability, compatible thermal expansion with the underlying substrate, improved erosion resistance yet readily abrades when contacted by a blade tip of knife edge, and so on.

SUMMARY OF THE INVENTION

Accordingly, it is an object of the present invention to provide an air seal for use in a gas turbine engine.

It is a further object of the present invention to provide a method of forming a gas turbine engine air seal that provides the desired improved performance over present air seals.

It is yet another object of the present invention to provide such a method that produces seals in a cost effective manner.

It is still another object of the present invention to provide a seal that weighs no more than conventional seal material, and thus provides no weight penalty.

According to one aspect of the invention, an air seal is disclosed for use in a gas turbine engine having improved durability. The air seal includes a seal substrate and an abradable seal layer, which abradable seal layer is composed of a densified polyimide foam, preferably a thermomechanically densified polyimide foam.

According to another aspect of the invention, a gas turbine engine seal system is disclosed. The system broadly comprises a seal assembly having a seal substrate and an abradable seal material applied to a bond layer. The abradable seal material is composed of a densified polyimide foam. The system further comprises an engine component adapted for motion relative to the seal assembly and having an abrasive portion interacting with the abradable seal material. The abrasive portion of the engine component and the abradable seal material of the seal assembly cooperate to provide sealing.

According to yet another aspect of the invention, a method of forming an air seal having improved durability is disclosed. The method broadly comprises the steps of providing a polyimide foam, densifying the foam to form a layer of densified foam, providing a seal substrate, and bonding the layer of densified foam to a seal substrate to form said air seal.

One advantage of the present invention is that the seal provides improved acceptable durability and abradability, particularly at higher temperatures. In addition, the seal of the present invention is cost effective to produce and does not weigh any more than conventional seal materials.

Other details of the seal of the present invention, as well as additional advantages and objects will become apparent to those skilled in the art in light of the following description and accompanying drawings wherein like reference numerals depict like elements.

DETAILED DESCRIPTION OF THE PREFERRED EMBODIMENT(S)

Figure 1:
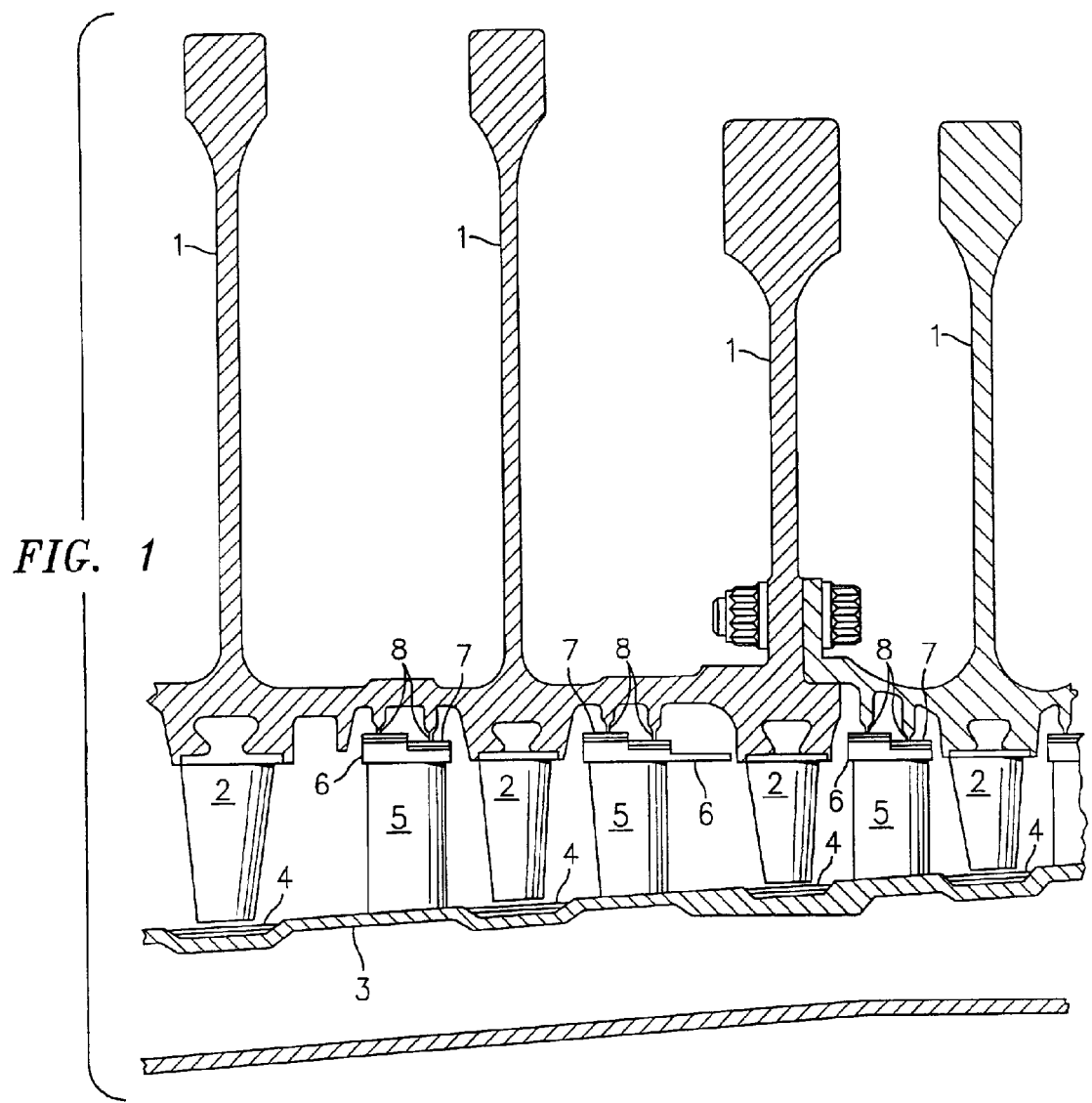
FIG. 1 is a cross sectional view of a portion of a typical gas turbine engine.

Referring now to FIG. 1, the present invention relates to an air seal for use in a gas turbine engine. The air seal cooperates with an engine component adapted for motion relative to the seal and having an abrasive portion interacting with an abradable seal material layer of the air seal to provide sealing. For example, the air seal may be used as an outer air seal 4 between the tip of a rotating vane or blade 2 and a case or housing 3. It may also be used as a knife edge seal 7 positioned between a portion 6 of a stator vane 5, such as a stator box, and a rotating disk tip portion 8.

The seal may be formed using any suitable commercially available polyimide foam as a starting material. One such suitable polyimide foam starting material is HT-340 polyimide foam available from Imi-Tech. This material has an initial density of about 0.4 pounds per cubic foot. Depending on the needed height for the seal, there may be one layer of polyimide foam as the starting material or multiple layers of polyimide foam as the starting material. If a multi-layer starting material is formed, any suitable laminating technique known in the art may be used to form the multi-layer starting material.

The polyimide foam starting material is then subjected to a densification treatment to increase the density of the polyimide foam from 0.4 pounds per cubic foot to a density greater than 10 pounds per cubic foot, such as from 12 pounds per cubic foot to 25 pounds per cubic foot. Preferably, the density of the foam is greater than 15 pounds per cubic foot. The densification treatment should also increase the shear strength of the polyimide foam to be in the range of from 140 psi to 325 psi.

While any suitable densification treatment known in the art may be used, it is preferred to use a thermomechanical densification treatment. In this treatment, the polyimide foam is first heated to a temperature greater than 550 degrees Fahrenheit and then compressed for a time sufficient to obtain the desired density and shear strength. Any suitable means known in the art may be used to compress the heated polyimide foam.

After the polyimide foam material has been densified, it may be cut to any desired height, length and width. The polyimide foam material is then bonded to a substrate such as one formed from a metallic material, such as a nickel-based, cobalt-based, or iron-based superalloy, or a polymer composite material such as a graphite-reinforced polyimide. The substrate is preferably an engine component such as a stator box 6 or a portion of the case 3. The polyimide foam material may be bonded to the substrate by a bonding layer formed from a suitable adhesive material. For example, one or more strips of a polyimide film adhesive may be placed on a surface of the polyimide foam material or a surface of the substrate. Depending on the location of the adhesive material strip(s), the polyimide foam material or the substrate may then be placed in contact with the adhesive material strip(s). Thereafter, the adhesive may be cured by applying heat and/or pressure to create a strong bond between the polyimide foam material and the substrate and thus form an air seal having an abradable seal layer composed of a densified polyimide foam.

The curing step referenced above comprises placing the air seal in an autoclave, surrounding the air seal with a vacuum bag, sealing the vacuum bag, applying a vacuum to the air seal in the autoclave, applying an autoclave pressure in the range of 8 psi to 12 psi, ramping the temperature in the autoclave from an initial temperature in the range of from 65 degrees Fahrenheit to 85 degrees Fahrenheit to a second temperature in the range of from 400 degrees Fahrenheit to 420 degrees Fahrenheit which is maintained for 30 minutes to 1.5 hours and thereafter cooling the air seal. The ramping step is preferably carried out at a ramp rate of from 3 degrees Fahrenheit per minute to 4 degrees Fahrenheit per minute. The cooling step is preferably carried out at a cooling rate of 3 degrees Fahrenheit per minute to 5 degrees Fahrenheit per minute.

Alternatively to using an autoclave, the curing step may comprise fixturing the air seal in a tool designed to apply mechanical pressure and heating in an oven as described previously.

If needed, the air seal may be subjected to a post curing treatment. Prior to subjecting the air seal to the post curing step, it may be desirable to subject the air seal to a drying treatment comprising heating the air seal to a temperature in the range of 225 degrees Fahrenheit to 275 degrees Fahrenheit for a time period in the range of 1 hour to 48 hours. This drying treatment is especially necessary if the substrate for the air seal is a graphite-reinforced polyimide composite.

The post curing treatment comprises placing said air seal in an oven, heating the oven to an initial temperature in the range of 65 degrees Fahrenheit to 85 degrees Fahrenheit, ramping the initial temperature to a second temperature in the range of 630 degrees Fahrenheit to 670 degrees Fahrenheit, holding the air seal at the second temperature for a time in the range of 60 minutes to 150 minutes, and thereafter cooling the air seal. The ramping step is performed at a ramp rate of 1.5 degrees Fahrenheit per minute to 4 degrees Fahrenheit per minute. The cooling step is performed at a rate in the range of from 3 degrees Fahrenheit per minute to 5 degrees Fahrenheit per minute.

Figure 2:
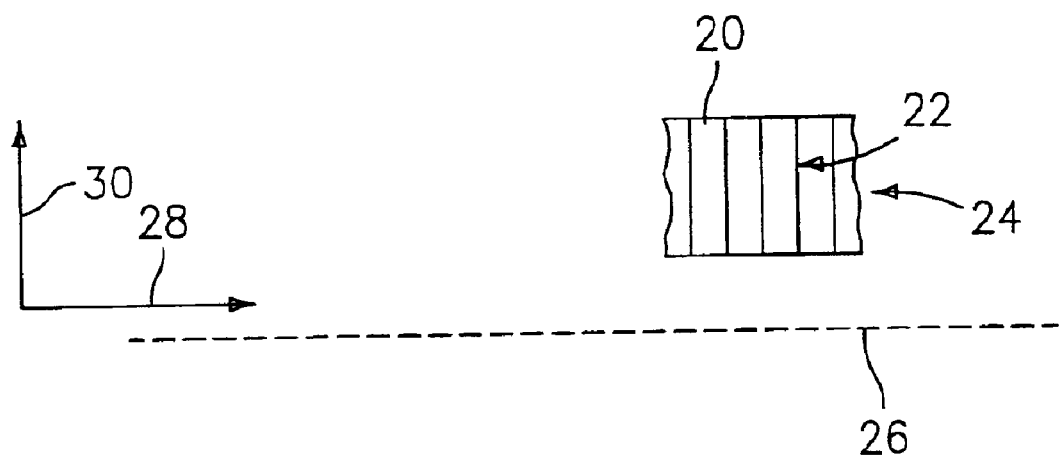
FIG. 2 is a cross sectional view of an exemplary seal in accordance with the present invention.

Referring now to FIG. 2, it has been found that when the air seal 4,7 is formed from a plurality of layers 20 of densified polyimide foam material and has a plurality of lamination planes 22 perpendicular to the lamination direction 24, the air seal 4,7 should be installed so that the lamination planes 22 are substantially perpendicular to the centerline 26 and the axial direction 28 of the engine and substantially parallel to the radial direction 30 of the engine. Even if only a single layer of densified foam is used, the seal should be oriented in this way. This is because the densification process itself results in the formation of fault planes.

Figure 3:
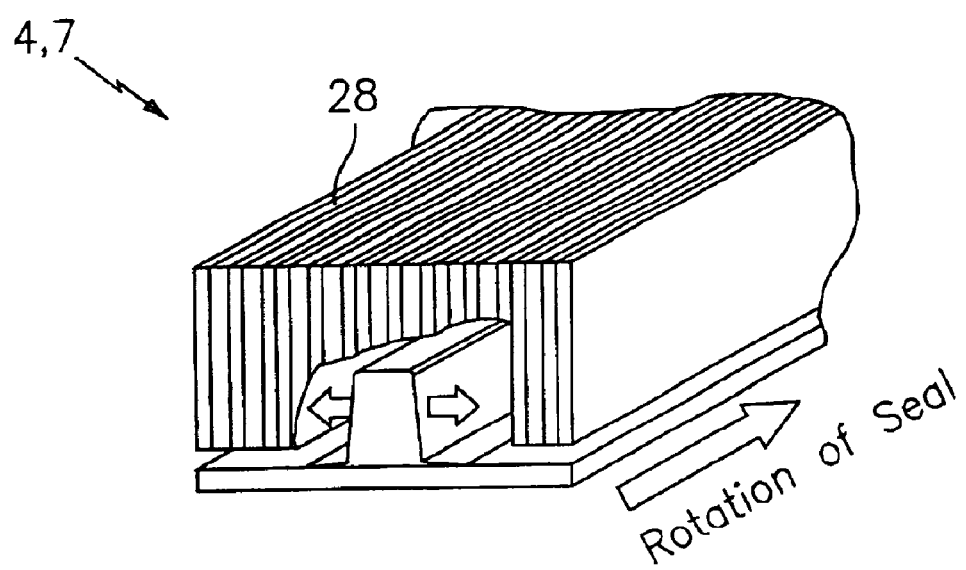
FIG. 3 is a perspective view showing the fault plane orientation of the seal relative to plate seal motions.

The laminated air seal 4,7 has fault planes defined by its lamination planes 22. The orientation of the fault planes relative to the plate seal motions are shown in FIG. 3.

As can be seen from the foregoing description, an air seal 4,7 has been provided which has an abradable seal layer formed from one or more layers of a densified polyimide material. The abrasive portion of the engine component and the abradable seal layer cooperate to provide the desired level of sealing.

Testing of the present invention using air seals formed from a polyimide foam material as described above and as laminated and adhered to the substrate indicates that the inventive air seals exhibit erosion resistance at least as good as conventional elastomeric (e.g., porous silicone rubber) seals. The air seals of the present invention also exhibit abradability at least as good as conventional, porous silicone rubber seals.

An advantage of the present invention is that the air seal provides both acceptable durability and abradability, and provides these characteristics at higher temperatures. In addition, the air seal of the present invention is cost effective, relatively simple to fabricate, and does not weigh any more than conventional seal materials.

While the present invention has been described above in some detail, numerous variations and substitutions may be made without departing from the spirit of the invention or the scope of the following claims. Accordingly, it is to be understood that the invention has been described by way of illustration and not by limitation.

What is claimed is:

1. A gas turbine engine seal system comprising:
    a seal assembly having a seal substrate and an abradable seal material applied to a bond layer;
    said abradable seal material being composed of a densified polyimide foam; and
    an engine component adapted for motion relative to the seal assembly and having an abrasive portion interacting with the abradable seal material, whereby the abrasive portion of the engine component and the abradable seal material of the seal assembly cooperate to provide sealing.

2. A gas turbine engine seal system according to claim 1, wherein said seal substrate comprises a stator box and said engine component comprises a disk.

3. A gas turbine engine seal system according to claim 1, wherein said seal substrate comprises a portion of a case and said engine component comprises a rotatable vane.

4. A gas turbine engine seal system according to claim 1, wherein:
    said engine component forms part of an engine having a centerline;
    said abradable seal material comprises a plurality of laminated layers of said polyimide foam having a lamination plane; and
    said lamination plane is substantially perpendicular to said centerline.

5. A gas turbine engine seal system according to claim 1, wherein said seal substrate comprises a component formed from a polymer composite.

6. A gas turbine engine seal system according to claim 1, wherein said densified polyimide foam comprises a thermomechanically densified polyimide form.

7. A gas turbine engine seal system according to claim 1, wherein said polyimide foam has a density of at least 10 pounds per cubic foot.

8. A gas turbine engine seal system according to claim 1, wherein said polyimide foam has a density of at least 15 pounds per cubic foot.

9. A gas turbine engine seal system according to claim 1, wherein said polyimide foam has a density in the range of from 12 pounds per cubic foot to 25 pounds per cubic foot.

10. A gas turbine engine seal system according to claim 1, wherein said polyimide foam has a shear strength in the range of 140 psi to 325 psi.

11. A gas turbine engine seal system according to claim 1, wherein said bond layer is formed by at least one adhesive strip.

12. A gas turbine engine seal system according to claim 1, wherein said bond layer is formed by a layer of adhesive material.

13. An air seal for use in a gas turbine engine having improved durability, comprising:
    a seal substrate; and
    an abradable seal layer on the seal substrate, said abradable seal layer being composed of a dpnsified polyimide foam.

14. An air seal according to claim 13, wherein said abradable seal layer has at least one layer of said densified polyimide foam.

15. An air seal according to claim 13, wherein said abradable seal layer comprises a plurality of layers of said densified polyimide foam.

16. An air seal according to claim 13, wherein said polyimide foam has a density of at least 10 pounds per cubic foot.

17. An air seal according to claim 13, wherein said polyimide foam has a density of at least 15 pounds per cubic foot.

18. An air seal according to claim 13, wherein said polyimide foam has a density in the range of from 12 pounds per cubic foot to 25 pounds per cubic foot.

19. An air seal according to claim 13, wherein said polyimide foam has a shear strength of 140 psi to about 325 psi.

20. An air seal according to claim 13, wherein said seal substrate comprises a polymer composite.

21. An air seal according to claim 13, wherein the air seal is an outer air seal.

22. An air seal according to claim 13, wherein the air seal is a knife edge seal.

23. An air seal according to claim 13, wherein the densified polyimide foam is a thermomechanically densified polyimide foam.

24. A gas turbine engine seal system comprising:
    a seal assembly having a seal substrate and an abradable seal material applied to a bond layer;
    said abradable seal material being composed of a densified polyimide foam;
    an engine component adapted for motion relative to the seal assembly and having an abrasive portion interacting with the abradable seal material, whereby the abrasive portion of the engine component and the abradable seal material of the seal assembly cooperate to provide sealing;
    said engine component forming part of an engine having a centerline;
    said abradable seal material comprising a plurality of laminated layers of said polyimide foam having a lamination plane;
    said lamination plane being substantially perpendicular to said centerline; and
    said lamination plane being substantially parallel to a radial direction of said engine and substantially perpendicular to an axial direction of said engine.

25. An air seal for use in a gas turbine engine having improved durability, comprising:
    a seal substrate; and
    an abradable seal layer on the seal substrate, said abradable seal layer consisting of a densified polyimide foam.

* * * * *

UNITED STATES PATENT AND TRADEMARK OFFICE
CERTIFICATE OF CORRECTION

PATENT NO. : 6,899,339 B2
APPLICATION NO. : 09/943321
DATED : May 31, 2005
INVENTOR(S) : Stuart A. Sanders et al.

It is certified that error appears in the above-identified patent and that said Letters Patent is hereby corrected as shown below:

In column 5, claim 6, line 37, delete "form" and insert --foam-- in its place.

In column 6, line 2, delete "dpnsified" and insert --densified-- in its place.

Signed and Sealed this

Eighteenth Day of July, 2006

JON W. DUDAS
*Director of the United States Patent and Trademark Office*